No. 628,661. Patented July 11, 1899.
J. C. HOWELL.
BATTERY ELECTRODE.
(Application filed July 8, 1898.)
(No Model.)
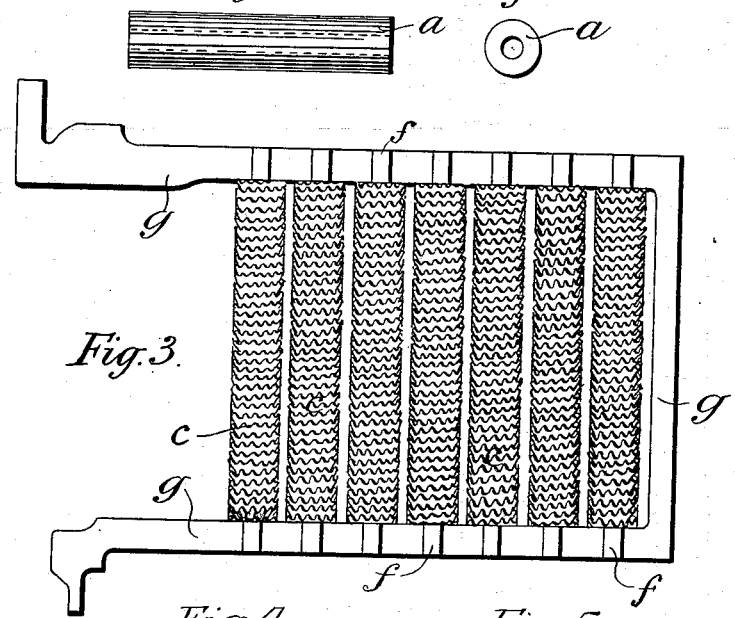
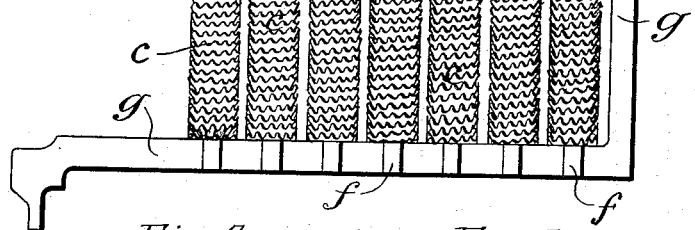
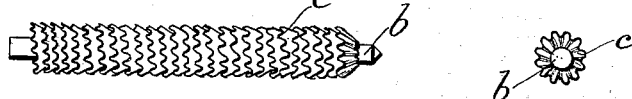
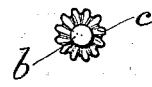
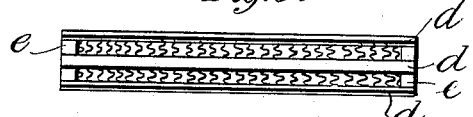
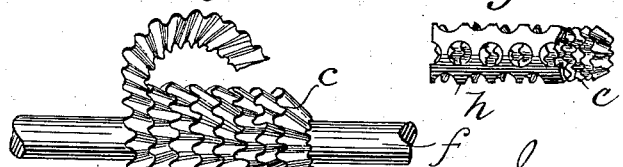

UNITED STATES PATENT OFFICE.

JOHN CHARLES HOWELL, OF LONDON, ENGLAND, ASSIGNOR TO THE POROUS ACCUMULATOR COMPANY, LIMITED, OF SAME PLACE.

BATTERY-ELECTRODE.

SPECIFICATION forming part of Letters Patent No. 628,661, dated July 11, 1899.

Application filed July 8, 1898. Serial No. 685,449. (No model.)

*To all whom it may concern:*

Be it known that I, JOHN CHARLES HOWELL, a subject of the Queen of Great Britain, residing at London, England, have invented a certain new and useful Improved Battery-Electrode, of which the following is a specification.

This invention relates to a form of helically-wound metallic ribbon particularly adapted for forming secondary-battery plates or electrodes, but useful also for other purposes, such as for primary batteries or for other uses where it is desired to produce an extended surface for a given weight of metal. The invention being described for use in a secondary battery, its application for other purposes will be evident.

It has long been known that to provide for economical working in electrolytic cells when heavy currents are employed the electrodes should present as large a surface as possible to the electrolyte; but great difficulties have been encountered in getting this extended surface without impairing the electrical continuity and the mechanical strength of the electrode. According to this invention such extended surface is obtained by so coiling and spacing a metallic ribbon that it becomes a plain or crinkled helix, with each turn in the form of a cone and partially covering the next preceding turn and with a central hole therethrough in which a core can be cast, making close electrical contact with the interior edges of the ribbon or external strips, or a surrounding tube, perforated or not, may be employed and the core omitted. A number of such coils can be connected to a metallic frame, so as to form a plate of any desired dimensions, or each coil may form an electrode of itself.

To clearly explain the invention, reference is made to the accompanying drawings, in which—

Figure 1 is a side elevation of a metal tube from which the ribbon is to be made. Fig. 2 is an end view of same. Fig. 3 represents a battery-plate formed of seven coils of helically-wound ribbon and a surrounding framework. Fig. 4 is a side elevation of the way the ribbon appears when wound upon a mandrel. Fig. 5 is an end elevation of same. Fig. 6 shows the ribbon when held in position by external strips. Fig. 7 is an end view of same. Fig. 8 shows in side elevation two lengths of helically-wound ribbon mounted upon a common core; and Fig. 9 represents, upon a larger scale, a view of a short length of such ribbon upon a core, while Fig. 10 represents a short length of perforated pipe suitable for carrying a helically-wound ribbon, a portion of which is shown therein.

One method by which such coils suitable for accumulator purposes can be obtained is to fix a lead or other suitable metallic tube $a$ to a mandrel which can be revolved and to place across the end of the tube an acute-angled knife or cutter which can be advanced in a direction parallel to the axis of the tube at rates which can be varied, say, from one-hundredth of an inch to one six-hundredths of an inch to one revolution of the tube. The rate of feed as between the knife and tube will depend upon the metal to be cut and upon whether a plain or crinkled helix is to be produced. As the tube is cut a ribbon of metal is produced which tends to curl around a second mandrel $b$, arranged to form a continuation of the axis of the tube. This mandrel may be made to be rotated or not and can be withdrawn as the length of the coil increases. The character of the coil so produced depends upon the amount of the second mandrel's rotation and the extent of its withdrawal, if the coil is attached to it, as compared with the length of ribbon produced.

If the rotation or withdrawal of the second mandrel be such that the coil be wound thereon without what may be called "back pressure," the surfaces of the metal helices will be comparatively smooth, while if the mandrel $b$, taking up the coil, has a slower rotation or withdrawal the ribbon $c$ is crinkled or bent to and fro upon itself, as most clearly seen in Fig. 9, thus producing a series of spaces or interstices between the coils which will permit a comparatively free access of the electrolyte to all parts of the coil. The ribbon $c$ so coiled can be supported by external strips $d$ and end pieces $e$ or by a surrounding perforated pipe, as indicated by $h$, Fig. 10; but it will generally be found preferable to mount them on cores $f$, and a number of such cores carrying the ribbon c can be formed into a battery-plate by casting or otherwise securing a frame g to such cores.

It has hitherto been proposed to use perforated and recessed plates of various kinds for battery work, and also it has been proposed to have a core with a screw thread or worm around it, and also it has been proposed to mount a series of separate washers of various forms upon a core; but so far it is believed no one has heretofore proposed to produce a continuous helically-wound ribbon from a single tube and mount such ribbon upon a core or frame, securing continuity of metallic contact and an extended metallic surface.

What is claimed is—

1. A battery-electrode comprising a metallic ribbon in the form of a helix with each turn in the form of a cone and partially covering the next preceding turn, substantially as described.

2. A battery-electrode comprising a metallic ribbon in the form of a helix with the turns superposed and each turn in the form of a cone, substantially as described.

3. A battery-electrode comprising a radially-corrugated metallic ribbon in the form of a helix with each turn in the form of a crinkled cone and partially covering the next preceding turn, substantially as described.

4. A battery-electrode comprising a core with a metallic ribbon in the form of a helix attached thereto, each turn in the form of a cone and partially covering the next preceding turn, substantially as described.

In testimony whereof I have hereunto set my hand in the presence of two subscribing witnesses.

JOHN CHARLES HOWELL.

Witnesses:
PHILIP M. JUSTICE,
ALLEN PARRY JONES.